(12) United States Patent
Gomyo et al.

(10) Patent No.: US 8,164,850 B2
(45) Date of Patent: Apr. 24, 2012

(54) FLUID DYNAMIC BEARING DEVICE, SPINDLE MOTOR, AND DISK DRIVE APPARATUS INCLUDING NICKEL COATED BEARING HOUSING

(75) Inventors: Masato Gomyo, Kyoto (JP); Hisaya Nakagawa, Kyoto (JP)

(73) Assignee: Nidec Corporation, Kyoto (JP)

( * ) Notice: Subject to any disclaimer, the term of this patent is extended or adjusted under 35 U.S.C. 154(b) by 864 days.

(21) Appl. No.: 12/180,786

(22) Filed: Jul. 28, 2008

(65) Prior Publication Data

US 2009/0034118 A1 Feb. 5, 2009

(30) Foreign Application Priority Data

Jul. 30, 2007 (JP) .................................. 2007-197175

(51) Int. Cl.
  *G11B 17/02* (2006.01)
(52) U.S. Cl. .................. 360/98.07; 360/99.08; 384/100; 384/107
(58) Field of Classification Search ............... 360/98.07, 360/99.08; 184/7.1; 384/100, 107; 310/90
See application file for complete search history.

(56) References Cited

U.S. PATENT DOCUMENTS

| | | | |
|---|---|---|---|
| 3,833,981 A | 9/1974 | Hepp et al. | |
| 4,220,379 A | 9/1980 | Pimiskern et al. | |
| 4,856,918 A | 8/1989 | Inoue et al. | |
| 6,015,434 A | 1/2000 | Yamane | |
| 6,072,660 A | 6/2000 | Teshima | |
| 6,921,208 B2 | 7/2005 | Yamshita et al. | |
| 7,146,733 B2 | 12/2006 | Yamashita et al. | |
| 7,284,908 B2 | 10/2007 | Yamamoto et al. | |
| 7,612,476 B2* | 11/2009 | Kodama ........................... | 310/90 |
| 2003/0153472 A1 | 8/2003 | Nagano et al. | |
| 2005/0108878 A1* | 5/2005 | Nishimura et al. ......... | 29/898.07 |
| 2005/0169561 A1* | 8/2005 | Asada et al. .................. | 384/107 |
| 2005/0201645 A1* | 9/2005 | Asada et al. .................. | 384/100 |
| 2006/0171615 A1* | 8/2006 | Kodama ........................ | 384/100 |
| 2007/0144833 A1* | 6/2007 | Nii et al. ........................ | 184/7.1 |
| 2007/0172159 A1 | 7/2007 | Komori et al. | |

(Continued)

FOREIGN PATENT DOCUMENTS

CN 1428407 A 7/2003

(Continued)

OTHER PUBLICATIONS

Chinese Office Action Issued in Related to Chinese Application No. 200810129995.6 Dated Sep. 25, 2009 With English Translation.

(Continued)

*Primary Examiner* — Jefferson Evans
(74) *Attorney, Agent, or Firm* — Keating & Bennett, LP

(57) ABSTRACT

A fluid dynamic bearing device includes a sleeve having a bearing hole into which a shaft is inserted, the sleeve rotatably supporting the shaft to make relative rotation about a center axis and a bearing housing made of a cold-rolled steel plate or a galvanized steel plate, the sleeve being received within the bearing housing. The bearing housing is filled with lubricating oil mainly composed of ester. A radial dynamic pressure bearing portion is provided between an outer circumferential surface of the shaft and an inner circumferential surface of the sleeve, the radial dynamic pressure bearing portion having radial dynamic pressure grooves for holding the lubricating oil as working fluid and for inducing a fluid dynamic pressure in the lubricating oil during the relative rotation. At least a surface region of the bearing housing remaining in contact with the lubricating oil is coated with a layer mainly composed of nickel.

10 Claims, 8 Drawing Sheets

U.S. PATENT DOCUMENTS

| | | | |
|---|---|---|---|
| 2008/0008408 A1* | 1/2008 | Asada et al. | 384/100 |
| 2008/0078084 A1* | 4/2008 | Sekii et al. | 29/898.02 |
| 2008/0174193 A1* | 7/2008 | Kodama | 310/90 |
| 2009/0154852 A1* | 6/2009 | Asada et al. | 384/121 |

FOREIGN PATENT DOCUMENTS

| | | |
|---|---|---|
| JP | 61-112818 | 5/1986 |
| JP | 09-044985 | 2/1997 |
| JP | 10-299763 | 11/1998 |
| JP | 11-117934 | 4/1999 |
| JP | 2000-120695 | 4/2000 |
| JP | 2002-078280 | 3/2002 |
| JP | 2003-239974 | 8/2003 |
| JP | 2004-146011 | 5/2004 |
| JP | 2004-257444 | 9/2004 |
| JP | 2005-113987 | 4/2005 |
| JP | 2006-029483 | 2/2006 |
| JP | 2006-077922 | 3/2006 |

OTHER PUBLICATIONS

Shirai et al., "Bearing Device, Spindle Motor and Disk Drive Apparatus," U.S. Appl. No. 12/629,095, filed Dec. 2, 2009.

Gomyo, "Fluid Dynamic Pressure Bearing, Spindle Motor, Disk Driver, and Production Method of the Fluid Dynamic Pressure Bearing," U.S. Appl. No. 12/234,743, filed Sep. 22, 2008.

* cited by examiner

FLUID DYNAMIC BEARING DEVICE, SPINDLE MOTOR, AND DISK DRIVE APPARATUS INCLUDING NICKEL COATED BEARING HOUSING

FIELD OF THE INVENTION

The present invention relates to a fluid dynamic bearing device, a spindle motor with the fluid dynamic bearing device and a disk drive apparatus provided with the spindle motor.

BACKGROUND OF THE INVENTION

A hard disk apparatus for use in a personal computer, a car navigation and so forth is equipped with a spindle motor for rotating a magnetic disk about a center axis thereof. The spindle motor is of a configuration in which a rotor is rotated relative to a stator through a bearing device. In recent years, a fluid dynamic bearing device with lubricating oil filled between a shaft and a sleeve is widely used as a bearing device for the spindle motor. The fluid dynamic bearing device allows the shaft and the sleeve to make relative rotation, while generating a fluid dynamic pressure in the lubricating oil by use of radial dynamic pressure grooves formed in an outer circumferential surface of the shaft or in an inner circumferential surface of the sleeve and thrust dynamic pressure grooves formed in one end surface of the shaft or in one end surface of the sleeve.

Conventional fluid dynamic bearing devices are disclosed in, e.g., Japanese Patent Laid-open Publication Nos. H09-044985 and H11-117934.

Some of the conventional fluid dynamic bearing devices are of the type including a sleeve made of a porous sintered body and a bearing housing surrounding the sleeve to prevent leakage of lubricating oil. As the bearing housing, there is used a bottom-closed cylindrical housing produced by press-forming a galvanized steel sheet (SECE) obtained by electro-galvanizing, e.g., a cold-rolled steel sheet (SPCC, SPCD, SPCE or the like). Ester oil superior in flowability and thermal stability is often used as the lubricating oil.

However, since zinc contained in a galvanized layer of the bearing housing acts as a catalyst against the ester oil, there is a possibility that the ester oil in the bearing housing may be changed in quality and deteriorated by the zinc. FIG. 8 is a graph representing the distribution of absorbance of the ester oil against lights of different wave numbers irradiated on the ester oil, which is measured by use of a Fourier transform infrared spectrophotometer (FT-IR). FIG. 9 shows same as FIG. 8, but the distribution is measured by use of a Fourier transform infrared spectrophotometer (FT-IR) after zinc is added to the ester oil and a few days has lapsed. In FIGS. 8 and 9, the horizontal axis denotes the wave number of the light irradiated, while the vertical axis stands for the absorbance. Comparison of FIGS. 8 and 9 reveals that, in FIG. 9, the absorbance is decreased at the wave number around 1596/cm (the circled portion "A" in FIG. 9). In other words, it can be seen that the molecular bonds in the ester oil have undergone certain modification under the action of zinc and the ester oil has suffered from a change in quality.

On the other hand, if a non-galvanized cold-rolled steel plate is used as a material of the bearing housing, it is possible to avoid the change in quality of the ester oil which would otherwise be caused by zinc. Even in this case, however, there is a possibility that the composition of the ester oil may be affected by metallic components mixed into the lubricating oil during the sliding movement of the bearing housing relative to the member received in the bearing housing or by rust generated on the surface of the bearing housing.

If high-priced resin (LCP resin or PPS resin) or stainless steel, which is less likely to change the quality of the ester oil, is used as a material of the bearing housing, the cost of producing the bearing housing is increased, thus hindering cost-effective production of the fluid dynamic bearing device.

SUMMARY OF THE INVENTION

The present invention provides a fluid dynamic bearing device capable of preventing a change in quality of lubricating oil and reducing production costs, a spindle motor with the fluid dynamic bearing device and a disk drive apparatus provided with the spindle motor.

In accordance with an aspect of the present invention, there is provided a fluid dynamic bearing device including: a shaft; a sleeve having a bearing hole into which the shaft is inserted, the sleeve rotatably supporting the shaft to make relative rotation about a center axis; and a bearing housing made of a cold-rolled steel plate or a galvanized steel plate, the sleeve being received within the bearing housing, wherein the bearing housing is filled with lubricating oil mainly composed of ester, wherein a radial dynamic pressure bearing portion is provided between an outer circumferential surface of the shaft and an inner circumferential surface of the sleeve, the radial dynamic pressure bearing portion having radial dynamic pressure grooves for holding the lubricating oil as working fluid and for inducing a fluid dynamic pressure in the lubricating oil during the relative rotation, wherein at least a surface region of the bearing housing remaining in contact with the lubricating oil is coated with a layer mainly composed of nickel.

It is preferable that the entire surface of the bearing housing is coated with the layer mainly composed of nickel.

The sleeve may be made of a porous sintered body impregnated with the lubricating oil.

The fluid dynamic bearing device may further include a counter plate axially confronting one end portion of the shaft in the bearing housing, the end portion of the shaft having a convex surface, and wherein a pivot bearing portion is provided between the end portion of the shaft and the counter plate.

The shaft may include a thrust plate fixed to one end portion of the shaft and arranged opposite to the bearing housing and wherein a thrust dynamic pressure bearing portion may be provided between the thrust plate and the bearing housing, the thrust dynamic pressure bearing portion having thrust dynamic pressure grooves for holding the lubricating oil as working fluid and for inducing a fluid dynamic pressure in the lubricating oil during the relative rotation.

The bearing housing may be a member is made of press-formed the cold-rolled steel plate or the galvanized steel plate.

In accordance with an another aspect of the present invention, there is provided a spindle motor including: a base member; a magnetic flux generating portion fixed to the base member; a rotor rotatably supported relative to the base member by means of the fluid dynamic bearing device described above; and a rotor magnet attached to the rotor opposite to the magnetic flux generating portion.

In accordance with a still another aspect of the present invention, there is provided a disk drive apparatus for rotating a disk, including: an apparatus housing; the spindle motor fixed inside the apparatus housing; and an access part performing at least one of reading information from and writing information on the disk.

With such configurations, at least the oil-contacting surface region of the bearing housing formed of a cold-rolled steel plate or a galvanized steel plate is coated with the layer mainly composed of nickel. Therefore, the lubricating oil filled in the bearing housing is kept from making direct contact with the cold-rolled steel plate or the galvanized steel plate. This makes it possible to prevent the lubricating oil from undergoing a change in quality, which would otherwise occur under the influence of these materials. Furthermore, it is possible to produce the bearing housing in a cost-effective manner, as compared to a case that the bearing housing is made of high-priced resin or stainless steel which is less likely to change or deteriorate the quality of the lubricating oil. Moreover, the bearing housing shows increased wear resistance because it is coated with the layer mainly composed of nickel.

Further, since the entire surface of the bearing housing is coated with the layer mainly composed of nickel, it is possible to reduce the generation of particles or rust over the entire surface of the bearing housing.

Moreover, since the sleeve is made of a porous sintered body impregnated with the lubricating oil, the slidability between the sleeve and the shaft is improved. Furthermore, it becomes possible to cost-effectively produce the sleeve, which makes it possible to further reduce the production costs of the fluid dynamic bearing device.

The pivot bearing portion is provided between the end portion of the shaft having a convex surface and the counter plate arranged inside the bearing housing. Therefore, it is possible to allow the shaft and the sleeve to make relative rotation with reduced rotation resistance, while stably supporting the shaft in an axial direction.

Also, the thrust dynamic pressure bearing portion is provided between the thrust plate fixed to the end portion of the shaft and the bearing housing. Therefore, it is possible to allow the shaft and the sleeve to make relative rotation with reduced rotation resistance, while stably supporting the shaft in the axial direction. It may be possible to additionally provide a thrust dynamic pressure bearing portion between the thrust plate fixed to the end portion of the shaft and the sleeve.

Lastly, since the bearing housing is a member produced by press-forming the cold-rolled steel plate or the galvanized steel plate, it becomes possible to cost-effectively produce the bearing housing, which makes it possible to further reduce the production costs of the fluid dynamic bearing device.

BRIEF DESCRIPTION OF THE DRAWINGS

The object and features of the present invention will become apparent from the following description of embodiments given in conjunction with the accompanying drawings, in which.

DETAILED DESCRIPTION OF THE EMBODIMENTS

Hereinafter, embodiments of the present invention will be described with reference to the accompanying drawings. In the following description, the terms "upper", "lower", "upper surface", "lower surface" and the like are used in terms of the vertical direction in FIGS. 1 to 7. These terms are used for the sake of convenience in description but are not intended to limit installation posture of the fluid dynamic bearing device, the spindle motor and the disk drive apparatus of the present invention.

1. Configuration of Disk Drive Apparatus

Figure 1:
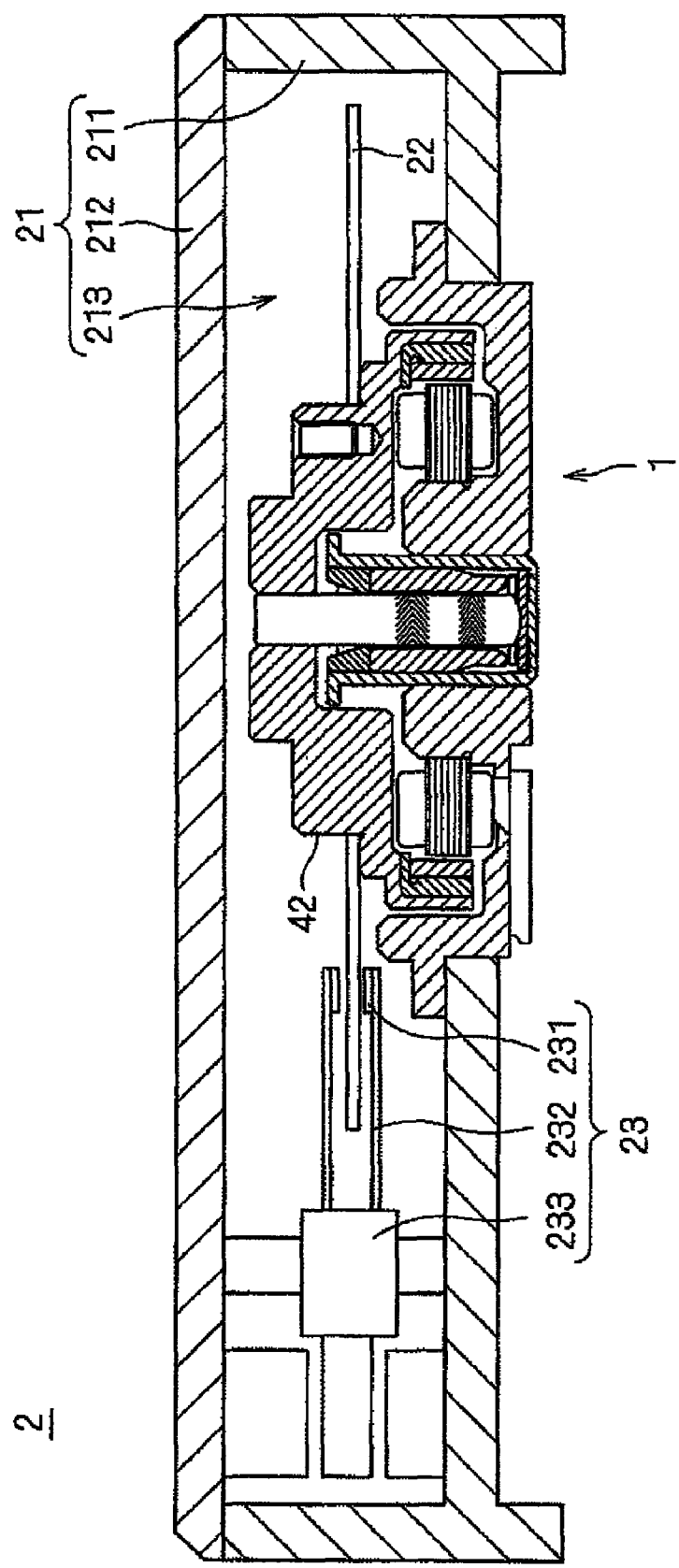
FIG. 1 is a vertical section view showing a disk drive apparatus in accordance with the present invention.

FIG. 1 is a vertical section view showing a disk drive apparatus 2 in accordance with an embodiment of the present invention. The disk drive apparatus 2 is a hard disk apparatus that reads and writes information while rotating a magnetic disk 22. As shown in FIG. 1, the disk drive apparatus 2 mainly includes an apparatus housing 21, a disk 22, a spindle motor 1 and an access part 23.

The apparatus housing 21 includes a cup-shaped first housing member 211 and a plate-like second housing member 212. The first housing member 211 has an upper opening. The spindle motor 1 and the access part 23 are installed on the inner bottom surface of the first housing member 211. The second housing member 212 is bonded to the first housing member 211 such that it covers the upper opening of the first housing member 211. The disk 22, the spindle motor 1 and the access part 23 are received within an internal space 213 of the apparatus housing 21 enclosed by the first housing member 211 and the second housing member 212. The internal space 213 of the apparatus housing 21 is a clean space where debris or dust is kept in an extremely small amount.

The disk 22 refers to a disk-shaped storage medium which can store information therein and having an aperture formed in its central region. The disk 22 is mounted to a hub member 42 of the spindle motor 1 and is rotatably supported on the spindle motor 1. The access part 23 includes a head 231, an arm 232 and a head moving mechanism 233. The head 231 is arranged in close proximity to a major surface of the disk 22 and is adapted to magnetically read information from and write information on the disk 22. The arm 232 is swung across the major surface of the disk 22 while supporting the head 231. The head moving mechanism 233 is installed on one side of the disk 22. The head moving mechanism 233 serves to move the head 231 relative to the disk 22 by swinging the arm 232. In response, the head 231 gains access to a desired position on the rotating disk 22, in which position the head 231 reads information from and writes information on the disk 22. It may be possible for the head 231 to perform one of the tasks of reading information from and writing information on the disk 22.

2. Configuration of Spindle Motor

Figure 2:
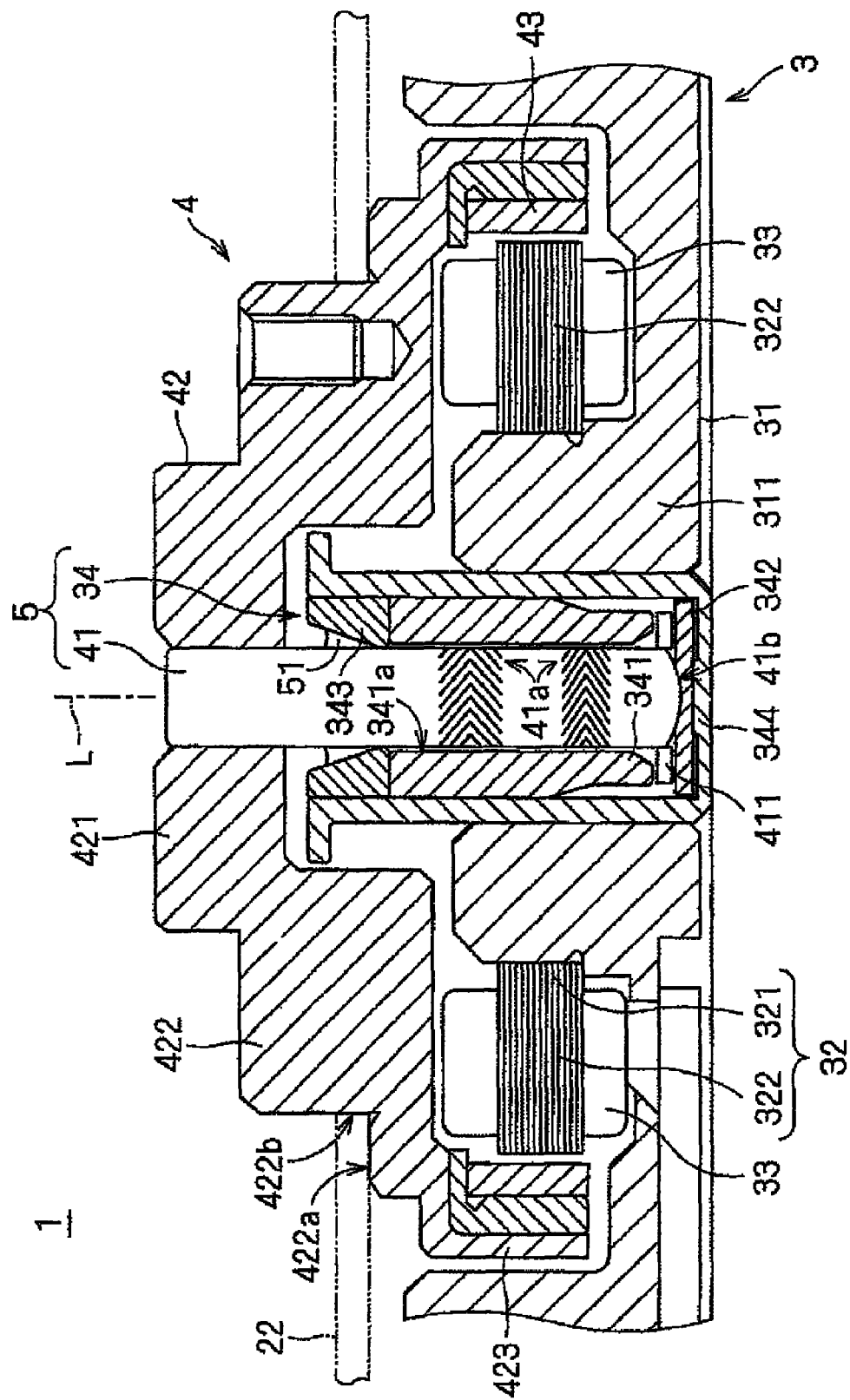
FIG. 2 is a vertical section view showing a spindle motor in accordance with the present invention.

Next, description will be made on the detailed configuration of the spindle motor 1. FIG. 2 is a vertical section view showing the spindle motor 1. As shown in FIG. 2, the spindle motor 1 mainly includes a stator part 3 fixed to the apparatus housing 21 of the disk drive apparatus 2 and a rotor part 4 for sustaining the disk 22 to rotate the same about a specified center axis L.

The stator part 3 includes a base member 31, a stator core 32, coils 33 and a fixed bearing unit 34.

The base member 31 is made of a metallic material such as aluminum or the like and is fixed to the apparatus housing 21 of the disk drive apparatus 2 by means of screws or the like. The base member 31 has a generally cylindrical holder portion 311 protruding around the center axis L in an axial direction (in a direction extending along the center axis L, which definition holds true hereinbelow). A through-hole for holding the fixed bearing unit 34 in place is formed on the inner circumference side of the holder portion 311 (the inner circumference side with respect to the center axis L, which definition holds true hereinbelow). An installation surface to which the stator core 32 is fitted is formed on the outer circumference side of the holder portion 311 (the outer circumference side with respect to the center axis L, which definition holds true hereinbelow).

Although the base member 31 and the first housing member 211 are formed as separate members in the present embodiment, they may be formed into a single member. In this case, the holder portion 311 is formed in the single member that constitutes the base member 31 and the first housing member 211.

The stator core 32 includes a yoke portion 321 fitted to the outer circumferential surface of the holder portion 311 and a plurality of tooth portions 322 protruding radially (in the radial direction with respect to the center axis L, which definition holds true hereinbelow) outwardly from the yoke portion 321. The stator core 32 is formed by, e.g., axially laminating electromagnetic steel plates.

The coils 33 are formed of conductive wires wound around the respective tooth portions 322 of the stator core 32. The coils 33 are connected to a specified power source device (not shown). If a driving current is supplied from the power source device to the coils 33, radial magnetic flux is generated in the tooth portions 322. The magnetic flux generated in the tooth portions 322 interacts with the magnetic flux of a rotor magnet 43, which will be set forth below, to generate a torque for rotating the rotor part 4 about the center axis L.

Figure 3:
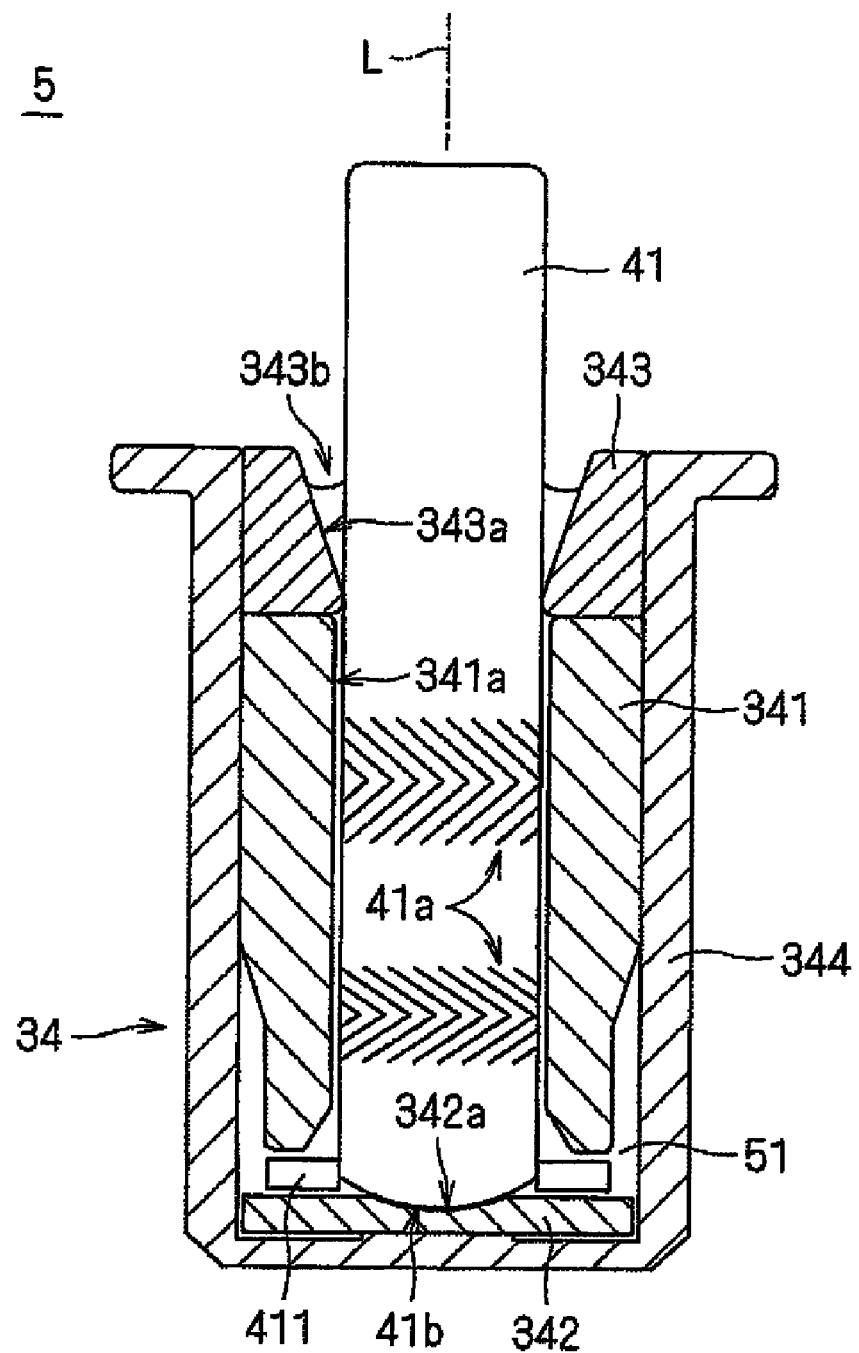
FIG. 3 is a vertical section view showing a fluid dynamic bearing device in accordance with the present invention.

The fixed bearing unit 34 refers to a mechanism that rotatably supports a shaft 41 of the rotor part 4. The fixed bearing unit 34 and the shaft 41 constitute a fluid dynamic bearing device 5. FIG. 3 is an enlarged vertical section view showing the fluid dynamic bearing device 5. As shown in FIG. 3, the fixed bearing unit 34 includes a sleeve 341, a counter plate 342, a seal member 343 and a bearing housing 344.

The sleeve 341 is a cylindrical member having a bearing hole 341a into which the shaft 41 is inserted. The sleeve 341 is fixed to an inner circumferential surface of the bearing housing 344. The sleeve 341 is adapted to support the shaft 41 in the bearing hole 341a to restrict radial movement of the shaft 41, while permitting rotation of the shaft 41 about the center axis L. The inner circumferential surface of the sleeve 341 and the outer circumferential surface of the shaft 41 are opposite to each other with a small gap (of, e.g., about several micrometers) left therebetween. Lubricating oil 51, which will be set forth below, is filled in the gap. The sleeve 341 is formed from a sintered body that can be obtained by heating, bonding and solidifying metal powder. When microscopically observed, the sleeve 341 is a porous body having a multiplicity of pores. The surface of the sleeve 341 is impregnated with lubricating oil. The shaft 41 can make smooth sliding movement relative to the sleeve 341 impregnated with lubricating oil. The sleeve 341 formed from a sintered body can be produced in a cost-effective manner.

The counter plate 342 is a disk-like member arranged below the shaft 41. The counter plate 342 makes contact with a lower end portion 41b of the shaft 41 on its upper surface to axially support the shaft 41 while allowing rotation of the shaft 41 about the center axis L. A recess portion 342a having a concave surface is formed in the central region of the upper surface of the counter plate 342. The recess portion 342a has a radius of curvature equal to or greater than that of the lower end portion 41b of the shaft 41. The recess portion 342a makes surface-to-surface or point-to-point contact with the lower end portion 41b of the shaft 41 on its upper surface, which provides a so-called pivot bearing mechanism between the counter plate 342 and the shaft 41. Such a pivot bearing mechanism allows the shaft 41 to rotate about the center axis L with reduced rotation resistance. The counter plate 342 may be made of metal such as stainless steel, aluminum or the like. Alternatively, the counter plate 342 may be made of ceramic or resin. The counter plate 342 may be integrally formed with the bearing housing 344 as a part of latter.

The seal member 343 is an annular member arranged above the sleeve 341. The seal member 343 has an inner circumferential surface 343a, which is a slanting surface whose inner diameter becomes greater in an axially upward direction. Accordingly, a gap 343b present between the inner circumferential surface 343a of the seal member 343 and the outer circumferential surface of the shaft 41 has an axially upwardly increasing width. The interfacial surface of lubricating oil 51 in the gap 343b is formed into a meniscus shape under the action of surface tension. This prevents the lubricating oil 51 from leaking to the outside of the fixed bearing unit 34. In other words, a tapered seal is provided in the gap 343b between the seal member 343 and the shaft 41. The seal member 343 may be made of, e.g., metal such as stainless steel, aluminum or the like or resin. The seal member 343 may be integrally formed with the sleeve 341.

The bearing housing 344 is a cylindrical member with its bottom closed for receiving the sleeve 341, the counter plate 342 and the seal member 343 therein. The bearing housing 344 is fixed, by press-fitting or shrink-fitting, into the through-hole formed on the inner circumference side of the holder portion 311 of the base member 31. The sleeve 341 and the seal member 343 are fixed into the inner circumferential surface of the bearing housing 344. The counter plate 342 is arranged on the bottom surface of the bearing housing 344.

Lubricating oil 51 mainly composed of ester is filled in the bearing housing 344. Examples of oil usable as the lubricating oil 51 include oil mainly composed of ester, such as polyol ester-based oil, diester-based oil or the like. The polyol ester-based oil has a structure obtained by esterifying polyhydric alcohol and saturated or unsaturated fatty acid having the number of carbon atoms of 5 to 20. Examples of the polyol ester-based oil include ester of hexamethylene glycol and caprylic acid or nonane acid, caprylic acid ester of decamethylene glycol, trimethylol propane ester of caproic acid and capric acid, or the like. The diester-based oil has a structure obtained by esterifying monovalent fatty alcohol and aliphatic or aromatic dicarboxylic acid. Examples of the diester-based oil include dioctyl adipate, diisononyl adipate, dioctyl azelate, dioctyl sebacate, or the like. The ester-based oil stated above is superior in wear resistance, thermal stability and flowability and is therefore desirably used as the lubricating oil 51 of the fluid dynamic bearing device 5. The lubricating oil 51 may be either a mixture of various kinds of ester or a mixture of ester and other components. If necessary, various kinds of additives well-known in the art, e.g., a viscosity index improver, a pour-point depressant, an antioxidant, a metal deactivator, a surfactant, an antirust agent and an anticorrosion agent, may be added to the lubricating oil 51 as long as they do not adversely affect the advantageous effects of the present invention.

The lubricating oil 51 is successively filled not only in a gap between the sleeve 341 and shaft 41 but also in the gaps between the sleeve 341 and the counter plate 342 and between the counter plate 342 and the bearing housing 344. A minute gap is partially formed between the sleeve 341 and the bearing housing 344, in which gap the lubricating oil 51 is filled in succession. In a nutshell, the interior of the bearing housing 344 as a whole is filled with the lubricating oil 51.

Figure 4:
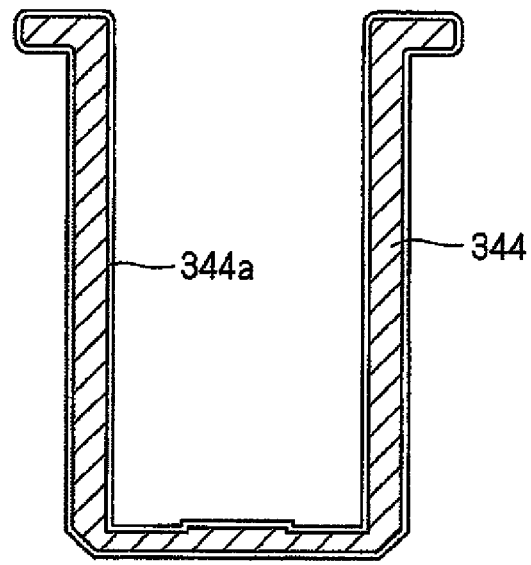
FIG. 4 is a vertical section view showing a bearing housing whose entire surface is plated with nickel.

The bearing housing 344 of the present embodiment is produced by press-forming a galvanized steel sheet (SECE) obtained by galvanizing a surface of a cold-rolled steel sheet (e.g., SPCC, SPCD and SPCE) into a bottom-closed cylindrical shape and plating the entire surface of the galvanized steel plate with nickel. In other words, the entire surface of the bearing housing 344 is coated with a nickel layer 344a as illustrated in FIG. 4. Therefore, the lubricating oil 51 filled in the bearing housing 344 is kept from making direct contact with the galvanized surface of the bearing housing 344. This makes it possible to prevent the lubricating oil 51 from undergoing a change in quality, which would otherwise be caused by zinc. Therefore, it is possible to enhance reliability and durability of the fluid dynamic bearing device 5. Furthermore, it is possible to produce the bearing housing 344 in a cost-effective manner, as compared to a case that the bearing housing 344 is made of a resin material (LCP resin, PPS resin or the like) or stainless steel which is less likely to change the quality of the lubricating oil 51.

Figure 5:
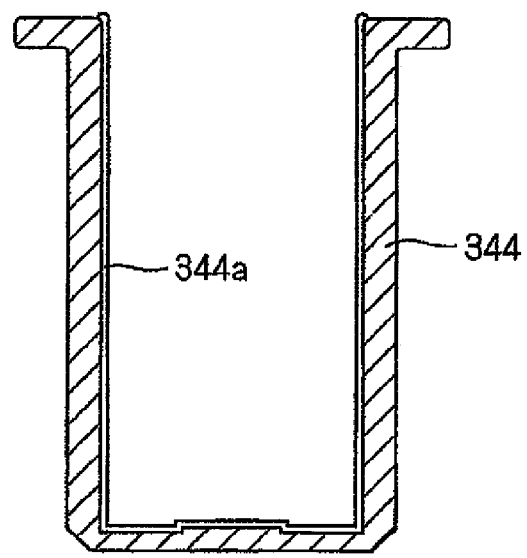
FIG. 5 is a vertical section view showing a bearing housing whose inner surface alone is plated with nickel.

The nickel layer 344a may cover at least the region of the surface of the bearing housing 344 that makes contact with the lubricating oil 51. For example, as shown in FIG. 5, the internal surface of the bearing housing 344 alone may be coated with the nickel layer 344a. However, if the entire surface of the bearing housing 344 is plated with nickel, it becomes possible to attain another technical effect that the generation of particles and rust on the external surface of the bearing housing 344 is reduced.

The nickel layer 344a is formed on the surface of the bearing housing 344 by, e.g., a so-called electroless nickel plating method in which nickel is reduced and deposited by using, e.g., a reduction agent. Then, the nickel layer 344a is subjected to heating at a temperature of 300° C. to 700° C. This makes it possible to increase surface hardness and to reduce wear. The thickness of the nickel layer 344a is set to, e.g., one micrometer to several hundreds of micrometers and preferably several tens of micrometers. The nickel layer 344a is not necessarily formed of nickel alone but may be mainly composed of nickel. For example, the nickel layer 344a may be made of alloy of nickel and phosphorus.

Referring back to FIG. 2, the rotor part 4 includes the shaft 41, a hub member 42 and a rotor magnet 43.

The shaft 41 is a generally columnar member extending along the center axis L. The shaft 41 is supported by the fixed bearing unit 34 in a state that the lower portion thereof is inserted into the bearing hole 341a of the sleeve 341. On the outer circumferential surface of the shaft 41, herringbone shaped radial dynamic pressure grooves 41a are formed for generating fluid dynamic pressure in the lubricating oil 51 between the outer circumferential surface of the shaft 41 and the inner circumferential surface of the sleeve 341. As the shaft 41 makes rotational movement, the lubricating oil 51 is pressurized by the radial dynamic pressure grooves 41a so that it can act as working fluid. Therefore, the shaft 41 is rotated in a state that it is radially supported by the lubricating oil 51. The radial dynamic pressure grooves 41a may be formed in either of the outer circumferential surface of the shaft 41 and the inner circumferential surface of the sleeve 341.

A flange member 411 for holding the shaft 41 against removal from the fixed bearing unit 34 is fixed to the lower end portion of the shaft 41. The flange member 411 is integrated with the shaft 41 to form a protrusion extending radially outwardly from the outer circumferential surface of the shaft 41. The flange member 411 has an upper surface axially confronting the lower surface of the sleeve 341. When an axially upwardly acting force is imparted on the rotor part 4, the upper surface of the flange member 411 comes into contact with the lower surface of the sleeve 341, thereby preventing separation of the rotor part 4 from the stator part 3. The shaft 41 and the flange member 411 may be formed of a single member.

The lower end portion 41b of the shaft 41 has a convex surface and protrudes axially downwardly from the flange member 411. The lower end portion 41b of the shaft 41 makes contact with the recess portion 342a (see FIG. 3) of the counter plate 342 so that the shaft 41 can be supported in the axial direction.

The hub member 42 is a member fixed to the shaft 41 for rotation therewith. The hub member 42 is of a shape radially outwardly extending around the center axis L. More specifically, the hub member 42 includes a coupling portion 421 fitted onto the upper end portion of the shaft 41 by press-fitting or shrink-fitting, a trunk portion 422 extending radially outwardly and downwardly from the coupling portion 421 and a suspending portion 423 suspended axially downwardly from an outer circumferential edge of the trunk portion 422. The hub member 42 covers the upper sides of the stator core 32, the coils 33 and the fixed bearing unit 34.

A first support surface 422a and a second support surface 422b for supporting the disk 22 thereon are formed in the trunk portion 422 of the hub member 42. The first support surface 422a is a planar surface extending perpendicularly to the center axis L, and the second support surface 422b is a cylindrical surface formed parallel to the center axis L on the inner circumference side of the first support surface 422a. When the disk 22 is mounted onto the hub member 42, the lower surface of the disk 22 comes into contact with the first support surface 422a while the inner circumference portion (the inner circumferential surface or inner circumferential edge) of the disk 22 makes contact with the second support surface 422b, whereby the disk 22 is kept in a horizontal posture. The hub member 42 is made of a metallic material, e.g., aluminum, magnetic SUS (stainless steel), a cold-rolled steel plate (SPCC, SPCD or SPCE) or the like.

The rotor magnet 43 is fixed to an inner circumferential surface of the suspending portion 423 of the hub member 42. The rotor magnet 43 is formed into an annular shape to surround the center axis L. The rotor magnet 43 has an inner magnetic surface confronting the outer circumferential surfaces of the tooth portions 322 of the stator core 32.

In the spindle motor 1 described above, if a driving current is applied to the coils 33 of the stator part 3, radial magnetic flux is generated in the tooth portions 322 of the stator core 32. Then, a torque is generated under the action of the magnetic flux between the tooth portions 322 and the rotor magnet 43, whereby the rotor part 4 is rotated about the center axis L relative to the stator part 3. The disk 22 supported on the hub member 42 is also rotated about the center axis L together with the shaft 41 and the hub member 42.

3. Modified Embodiments

Although one embodiment of the present invention has been described hereinabove, the present invention is not limited to the foregoing embodiment but may be modified in many different forms.

Figure 6:
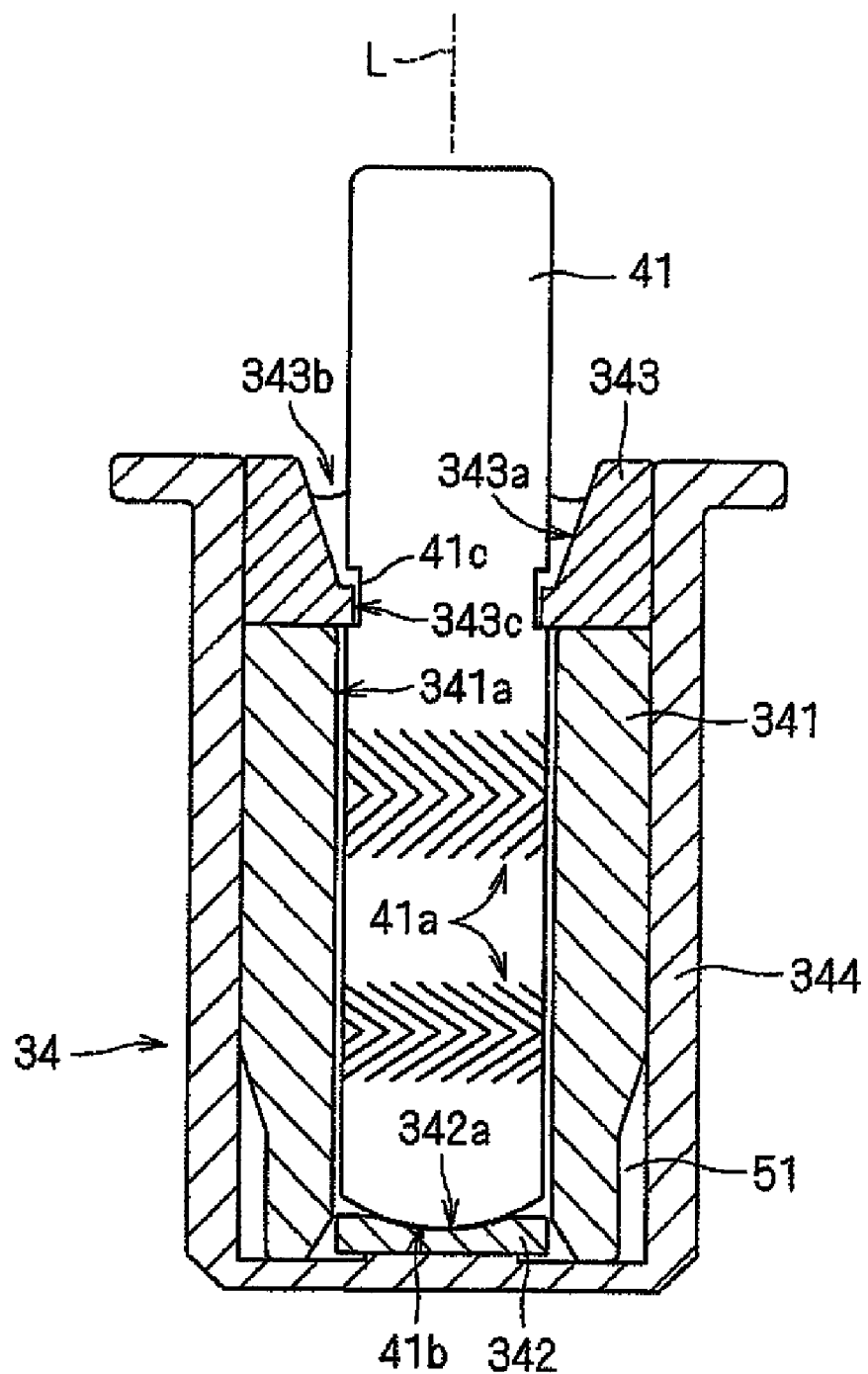
FIG. 6 is a vertical section view showing a modified embodiment of the fluid dynamic bearing device.

Although the removal of the shaft 41 out of the fixed bearing unit 34 is prevented by means of the flange member 411 fixed to the lower end portion of the shaft 41 in the foregoing embodiment, other configurations may be used to prevent the shaft 41 from being removed out of the fixed bearing unit 34. For example, as shown in FIG. 6, a radially inwardly protruding portion 343c may be formed in the inner circumference portion of the seal member 343 and a depressed portion 41c may be formed in the surface portion of the shaft 41 in a confronting relationship with the protruding portion 343c. The protruding portion 343c is fitted into the depressed portion 41c to prevent the shaft 41 from being removed out of the fixed bearing unit 34.

Figure 7:
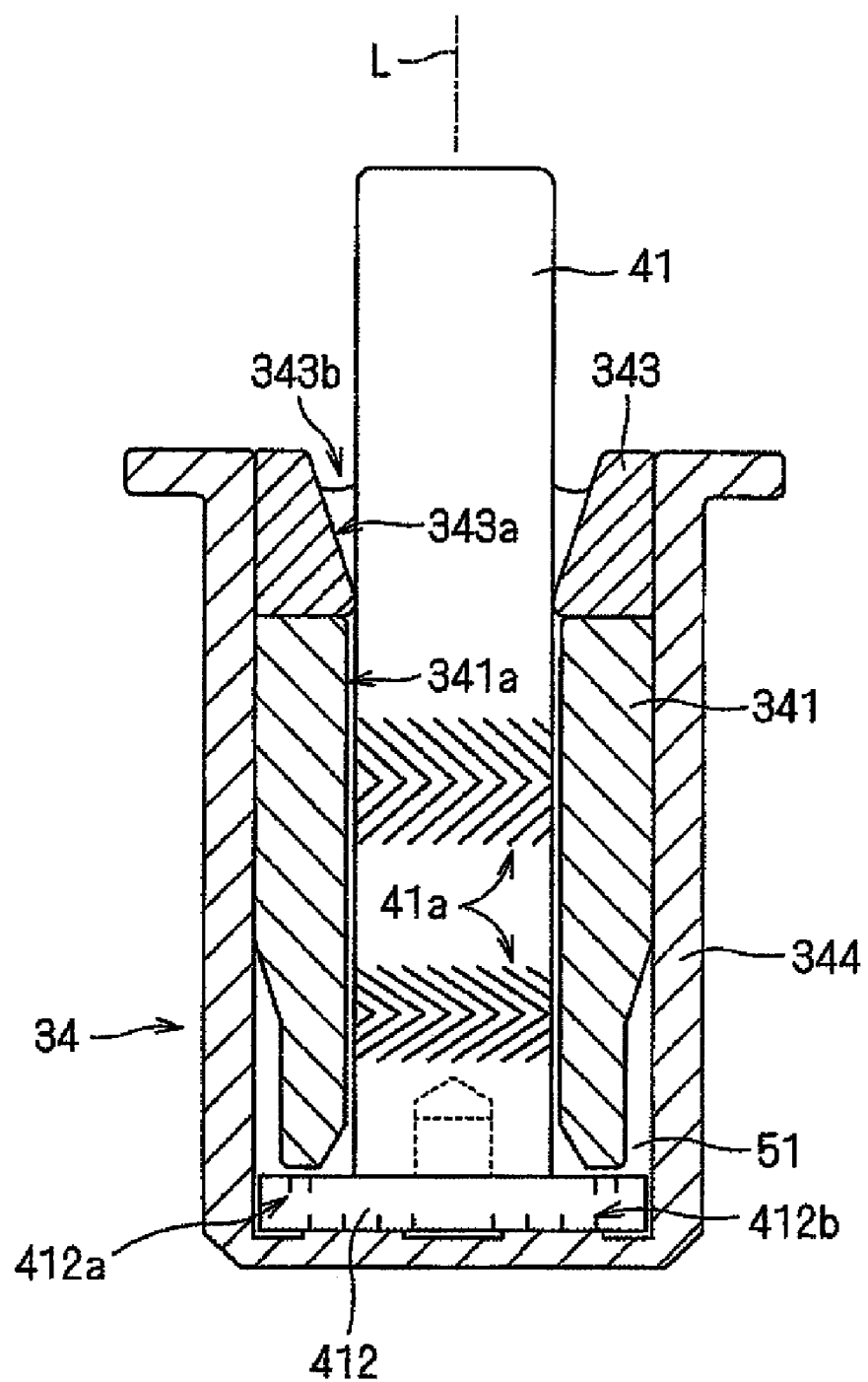
FIG. 7 is a vertical section view showing another modified embodiment of the fluid dynamic bearing device.
Figure 8:
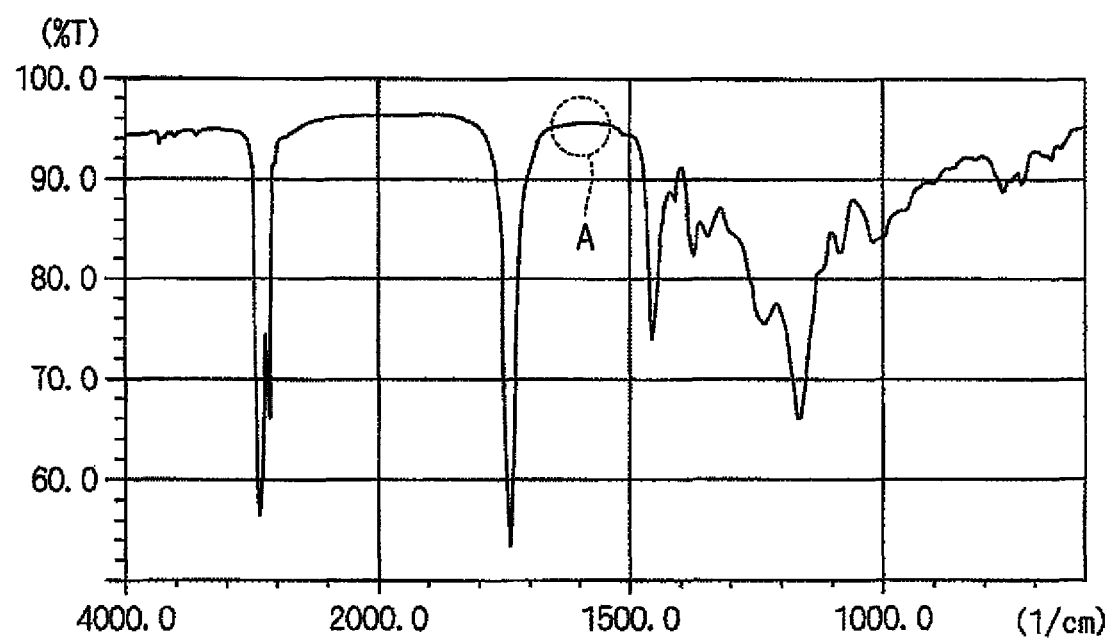
FIG. 8 is a graph representing the distribution of absorbance of ester oil prior to adding zinc to the ester oil.
Figure 9:
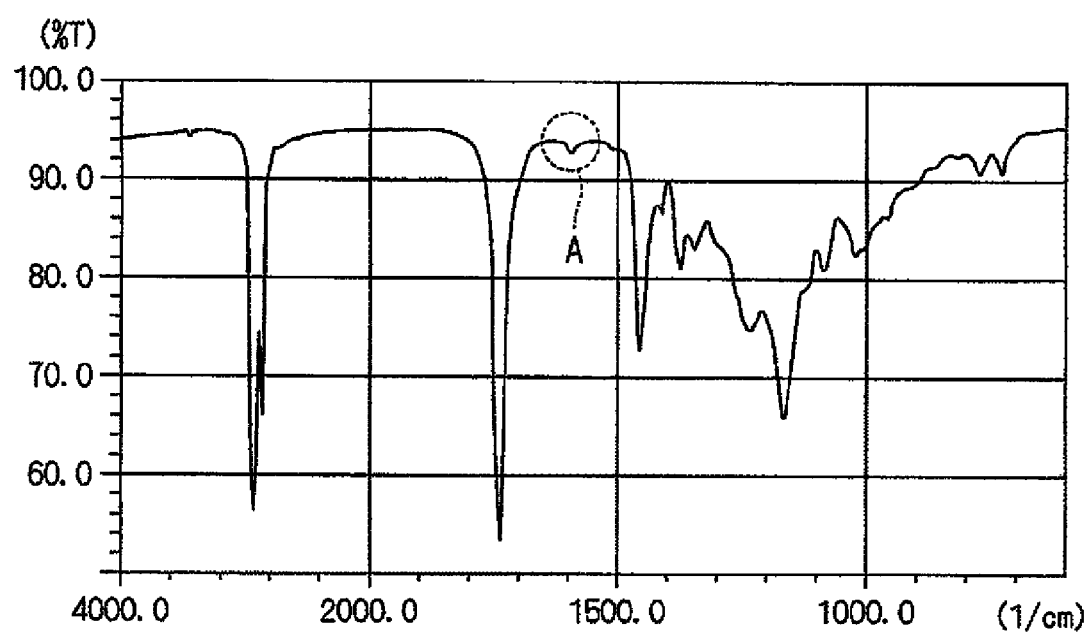
FIG. 9 is a graph representing the distribution of absorbance of ester oil after adding zinc to the ester oil.

Although the shaft 41 is allowed to make rotational movement relative to the counter plate 342 arranged within the bearing housing 344 in the foregoing embodiment, a thrust plate 412 rotating together with the shaft 41 may be employed in place of the counter plate 342. For example, as shown in FIG. 7, the thrust plate 412 may be fixed to the lower end portion of the shaft 41 by a screw so that the thrust plate 412 and the shaft 41 can integrally rotate with respect to the bearing housing 344. Spiral thrust dynamic pressure grooves 412a for generating a fluid dynamic pressure in the lubricating oil 51 present between the lower surface of the sleeve 341 and the thrust plate 412 are formed in the upper surface of the thrust plate 412. Likewise, spiral thrust dynamic pressure grooves 412b for generating a fluid dynamic pressure in the lubricating oil 51 present between the thrust plate 412 and the inner bottom surface of the bearing housing 344 are formed in the lower surface of the thrust plate 412. During rotation of the shaft 41 and the thrust plate 412, the lubricating oil 51 is pressurized by the thrust dynamic pressure grooves 412a and 412b so that the lubricating oil 51 can act as working fluid. Therefore, the shaft 41 is rotated in an axially supported state. Since the inner bottom surface of the bearing housing 344 is coated with a layer mainly composed of nickel, the thrust plate 412 makes smooth sliding movement with respect to the bearing housing 344. Consequently, it becomes possible to prevent generation of metal particles, which would otherwise occur by the sliding movement, and to prevent the lubricating oil 51 from undergoing a change in quality, which would otherwise occur by the metal particles mixed into the lubricating oil 51.

Although the lubricating oil 51 in the gap 343b has a single interfacial surface in the forgoing embodiment, the lubricating oil 51 may have a plurality of interfacial surfaces. Each of the interfacial surfaces is formed into a meniscus shape under the action of surface tension. This makes it possible to prevent the lubricating oil 51 from leaking to the outside of the fixed bearing unit 34.

Although a galvanized steel plate is used as a base material of the bearing housing 344 in the foregoing embodiment, it may be possible to use a non-galvanized cold-rolled steel plate in place of the galvanized steel plate. While the non-galvanized cold-rolled steel plate is more likely to generate rust than the galvanized steel plate, the generation of rust can be prevented by plating the surface of the bearing housing 344 with nickel. Furthermore, even when the thrust plate 412 and the bearing housing 344 make sliding movement with each other as illustrated in FIG. 7, it is possible to prevent generation of metal particles, which would otherwise occur by the sliding movement. Therefore, it becomes possible to prevent the lubricating oil 51 from undergoing a change in quality, which would otherwise occur by rust or metal particles.

Although a shaft-rotating outer rotor type motor has been described in the foregoing embodiment, the present invention may be applied to a shaft-fixed motor or an inner rotor type motor. Moreover, although the spindle motor 1 described above is designed to rotate the magnetic disk 22, the present invention may be applied to a motor for rotating other kinds of disk-shaped storage mediums such as an optical disk and the like.

While the invention has been shown and described with respect to the embodiment, it will be understood by those skilled in the art that various changes and modifications may be made without departing from the scope of the invention as defined in the following claims.

What is claimed is:

1. A fluid dynamic bearing device comprising:
   a shaft;
   a sleeve having a bearing hole into which the shaft is inserted, the sleeve rotatably supporting the shaft to make relative rotation about a center axis; and
   a bearing housing made of a cold-rolled steel plate or a galvanized steel plate, the sleeve being received within the bearing housing,
   wherein the bearing housing is filled with lubricating oil mainly composed of ester,
   wherein a radial dynamic pressure bearing portion is provided between an outer circumferential surface of the shaft and an inner circumferential surface of the sleeve, the radial dynamic pressure bearing portion having radial dynamic pressure grooves for holding the lubricating oil as working fluid and for inducing a fluid dynamic pressure in the lubricating oil during the relative rotation,
   wherein at least a surface region of the bearing housing remaining in contact with the lubricating oil is coated with a layer mainly composed of nickel.

2. The fluid dynamic bearing device of claim 1, wherein the entire surface of the bearing housing is coated with the layer mainly composed of nickel.

3. The fluid dynamic bearing device of claim 1, wherein the sleeve is made of a porous sintered body impregnated with the lubricating oil.

4. The fluid dynamic bearing device of claim 1, further comprising a counter plate axially confronting one end portion of the shaft in the bearing housing, the end portion of the shaft having a convex surface, and wherein a pivot bearing portion is provided between the end portion of the shaft and the counter plate.

5. The fluid dynamic bearing device of claim 1, wherein the shaft includes a thrust plate fixed to one end portion of the shaft and arranged opposite to the bearing housing and wherein a thrust dynamic pressure bearing portion is provided between the thrust plate and the bearing housing, the thrust dynamic pressure bearing portion having thrust dynamic pressure grooves for holding the lubricating oil as working fluid and for inducing a fluid dynamic pressure in the lubricating oil during the relative rotation.

6. The fluid dynamic bearing device of claim 1, wherein the bearing housing is a member produced by press-forming the cold-rolled steel plate or galvanized steel plate.

7. A spindle motor comprising:
   a base member;

a magnetic flux generating portion fixed to the base member;
a rotor rotatably supported relative to the base member by means of the fluid dynamic bearing device of claim 1; and
a rotor magnet attached to the rotor opposite to the magnetic flux generating portion.

8. A disk drive apparatus for rotating a disk, comprising:
an apparatus housing;
a spindle motor of claim 7 fixed inside the apparatus housing; and
an access part performing at least one of reading information from and writing information on the disk.

9. The fluid dynamic bearing device of claim 1, further comprising:

a thrust plate fixed to an axially lower end portion of the shaft and arranged between the sleeve and an axially lower portion of the bearing housing; and
a seal portion arranged on an axially upper portion of the bearing housing and arranged to retain an uppermost portion of the lubricating oil between the seal portion and the shaft.

10. The fluid dynamic bearing device of claim 1, where the layer mainly composed of nickel is arranged on a surface of the bearing housing directly opposed to the shaft, and the sleeve and is not provided on a surface of the bearing housing that is not opposed to the shaft and the sleeve.

* * * * *